United States Patent [19]

Matsuse et al.

[11] Patent Number: 4,567,555
[45] Date of Patent: Jan. 28, 1986

[54] CURRENT-TYPE GTO INVERTER WITH SURGE ENERGY RESTORATION

[75] Inventors: Kohki Matsuse, Tama; Hitoshi Hashimoto, Nagoya; Toshiaki Suzuki, Zushi, all of Japan

[73] Assignee: Kabushiki Kaisha Meidensha, Tokyo, Japan

[21] Appl. No.: 631,809

[22] Filed: Jul. 17, 1984

[30] Foreign Application Priority Data

Feb. 24, 1984 [JP] Japan .................................. 59-33804

[51] Int. Cl.⁴ .......................................... H02M 7/515
[52] U.S. Cl. ..................................... 363/138; 318/762; 363/37
[58] Field of Search .................... 318/759, 762; 363/35, 363/37, 51, 138, 137

[56] References Cited

U.S. PATENT DOCUMENTS

| | | | |
|---|---|---|---|
| 3,825,813 | 7/1974 | Wirtz | 363/138 |
| 4,072,882 | 2/1978 | Wiart et al. | 363/138 |
| 4,087,851 | 5/1978 | Klautschek | 363/138 |
| 4,326,246 | 4/1982 | Winkler et al. | 363/37 |

FOREIGN PATENT DOCUMENTS 1007170  3/1983  U.S.S.R. .............................. 363/138

*Primary Examiner*—Peter S. Wong
*Assistant Examiner*—D. L. Rebsch

*Attorney, Agent, or Firm*—Schwartz, Jeffery, Schwaab, Mack, Blumenthal & Evans

[57] ABSTRACT

In a current type GTO inverter, commutation surge voltage is inevitably generated from an inductive load whenever each GTO is turned off. The commutation surge voltage thus generated is once stored in a capacitor ($C_1$) through a diode surge voltage rectifier (5) and then restored to the DC source terminals (3A, 3B) of the GTO bridge-connected inverter (3) through a pair of other GTOs ($G_7$, $G_8$) turned on during steady state intervals of inverter commutation. Magnetic energy stored in a reactor ($L_{r1}$, $L_{r2}$) in motor-driving operation is recharged to the capacitor ($C_1$) through the diode surge voltage rectifier (5) after the GTOs ($G_7$, $G_8$) have been turned off; the motor kinetic energy stored in the capacitor ($C_1$) through diodes ($D_8$, $D_9$) in motor-braking operation is regenerated to the AC source side of the inverter (3) through a pair of other GTOs ($G_9$, $G_{10}$) when the voltage across the capacitor ($C_1$) exceeds a predetermined value, and magnetic energy stored in the reactor ($L_{r1}$, $L_{r2}$) in motor-braking operation is recharged to the capacitor ($C_1$) through diodes ($D_{12}$, $D_{13}$) after the GTOs ($G_9$, $G_{10}$) have been turned off. The circuit operation is stable at higher frequency range because no vibration circuits are provided, and the energy conversion efficiency is high because every energy loss is effectively restored to the inverter or the power source side.

1 Claim, 19 Drawing Figures

FIG.11A  STEADY

FIG.11B  TRANSIENT

CURRENT-TYPE GTO INVERTER WITH SURGE ENERGY RESTORATION

BACKGROUND OF THE INVENTION

1. Field of the Invention

The present invention relates generally to a current type GTO (gate turn-off thyristor) inverter, and more specifically to a surge voltage clamping circuit for clamping the surge voltage generated when each GTO incorporated in a current type GTO bridge-connected inverter is turned off. The clamped surge voltage is stored once in a capacitor and then returned to the terminals between the rectifier and the GTO inverter for energy restoration.

2. Description of the Prior Art

In a current-type gate turn-off thyristor bridge-connected inverter, since gate turn-off thyristors (referred to as GTOs, simply hereinafter) are incorporated in the inverter as the main switching elements, no commutating circuit including a commutation reactor, for instance, is required, because the GTO can be turned from on to off or vice versa in response to a control signal applied to the gate terminal thereof. Here, the terminology "commutation" means that the load current of one phase is switched to that of another plane or vice versa by thyristor switching operation. In the above-mentioned current-type GTO inverter, however, in the case where a load such as an induction motor having an inductance is coupled, commutation surge voltages are inevitably generated whenever each GTO is turned off. The generated surge voltages are superimposed upon the alternating output voltage of the GTO inverter, thus resulting in a problem in that some of the GTOs may be damaged by these commutation surge voltages.

In order to overcome the above problem, a commutation surge voltage clamping circuit has been proposed, by which the commutation surge voltages generated whenever each GTO is turned off are absorbed or stored in a single electrolytic capacitor and thereafter returned to the load side through the GTO inverter for reducing the electric power loss. This function is called energy restoration.

In the conventional commutation surge voltage clamping circuit used for a current type GTO inverter, however, there exist some disadvantages as follows.

(1) Since a pair of ordinary thyristors are used for restoring the stored commutation surge voltage energy to the DC source terminals of the GTO inverter, two vibration circuits or thyristor turning-off circuits including a capacitor and an inductor respectively are necessary. Further, since the surge voltage energy is restored through these capacitors used for the vibration circuits, the capacity of these capacitors of the vibration circuits is determined to be relatively large. As a result, the turn-off operation of the ordinary thyristors often fails at higher frequency range. In other words, it is impossible to stably operate the commutation surge voltage clamping circuit when the GTO inverter operates at a high speed.

(2) Since the commutation surge voltage energy is restored from the electrolytic capacitor to the DC source terminals of the GTO inverter through the vibration capacitors connected in series with the electrolytic capacitor, the capacitance of the restoring circuit is relatively large. Therefore, a reactor having a large inductance is necessary in order to smooth the current restored to the GTO inverter. In other words, the cost of the commutation surge voltage clamping circuit is relatively high.

(3) Since the charging and discharging circuits of the capacitor are operable only when the motor is driven in the forward or the reverse direction, when the motor is being braked, it is impossible to regenerate the motor kinetic energy stored in the capacitor in motor-braking operation to the AC source side of the inverter or to charge the magnetic energy stored in the reactor in motor-braking operation in the capacitor.

A more detailed description of the prior-art commutation surge voltage clamping circuit will be made with reference to the attached drawings under DESCRIPTION OF THE PREFERRED EMBODIMENT.

SUMMARY OF THE INVENTION

With these problems in mind, therefore, it is a primary object of the present invention to provide a surge voltage clamping circuit for a current type GTO inverter which can operate stably at high frequency range.

It is another object of the present invention to provide a surge voltage clamping circuit for a current type GTO inverter in which no vibration circuit for turning off the energy-restoring thyristor is provided without use of a large-inductance reactor, and therefore the circuit configuration is simplified or reducing the manufacturing cost.

It is still the other object of the present invention to provide a surge voltage clamping circuit for a current type GTO inverter which can also regenerate the motor kinetic energy while the motor is driven in the forward or reverse direction or being braked.

To achieve the above-mentioned object, a surge voltage clamping circuit for a current type GTO inverter according to the present invention comprises (a) a GTO bridge-connected inverter, (b) a thyristor bridge-connected rectifier, (c) a diode bridge-connected commutation surge voltage rectifier, (d) a capacitor for storing commutation surge voltage energy, (e) a cumulative reactor, (f) a DC reactor, (g) a first GTO, (h) a second GTO, (i) a first diode, (j) a second diode, (k) a third GTO, (l) a fourth GTO, (m) a third diode and (n) a fourth diode. In the circuit configuration thus constructed, commutation surge voltage energy stored in said capacitor in motor-driving operation is restored to said inverter through said first and second GTOs during steady state intervals of inverter commutation; magnetic energy stored in said reactor in motor-driving operation is recharged to said capacitor through said first and second diodes after said first and second GTOs have been turned off; the motor kinetic energy stored in said capacitor in motor-braking operation is regenerated to the AC source through said third and fourth GTOs when the voltage across said capacitor exceeds a predetermined value; and magnetic energy stored in said reactor in motor-braking operation is recharged to said capacitor through said third and fourth diodes after said third and fourth GTOs have been turned off.

BRIEF DESCRIPTION OF THE DRAWINGS

The features and advantages of a surge voltage clamping circuit for a current-type GTO inverter according to the present invention over the prior art clamping circuit will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENT

To facilitate understanding of the present invention, a reference will be made to an example of prior-art surge voltage clamping circuits for a current type GTO bridge-connected inverter, with reference to the attached drawings.

Figure 1:
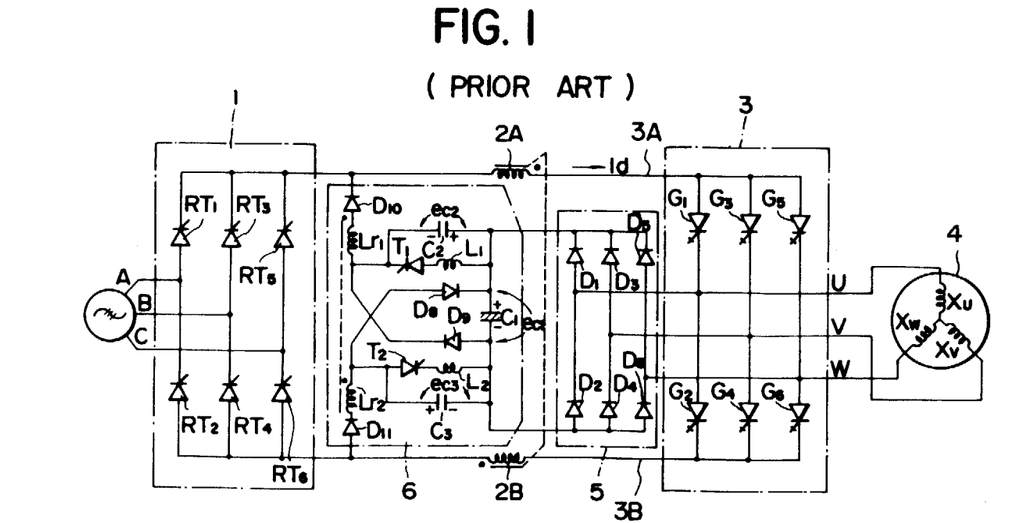
FIG. 1 is a circuit diagram of a prior-art surge voltage clamping circuit for a current-type GTO inverter.

With reference to FIG. 1, the GTO inverter provided with a surge voltage clamping circuit is roughly made up of a thyristor bridge-connected current rectifier 1, a DC reactor having two inductive reactances 2A and 2B magnetically connected each other, a GTO (gate turn-off thyristor) bridge-connected inverter 3, an induction motor 4, a diode bridge-connected commutation surge voltage rectifier 5, and a commutation surge voltage clamping circuit 6 including an electrolytic capacitor $C_1$. The above clamping circuit 6 functions also as a commutation surge voltage energy restoring circuit.

The thyristor bridge-connected rectifier 1 includes six rectifying thyristors $RT_1$ to $RT_6$, which are turned on sequentially in the order of $RT_1$ and $RT_6$, $RT_3$ and $RT_2$ and $RT_5$ and $RT_4$ so that each half cycle of the sine wave of a three-phase power source can be passed in sequence. Therefore, when the rectifying thyristors $RT_1$ and $RT_6$ are both turned on, a first-phase current R is supplied from the terminal A to the terminal C by way of thyristor $RT_1$, reactor 2A, terminal 3A, GTO bridge-connected inverter 3, motor 4, GTO bridge-connected inverter 3, terminal 3B, reactor 2B, and thyristor $RT_6$. Similarly, when the rectifying thyristors $RT_3$ and $RT_2$ are both turned on, a second-phase current S is supplied from the terminal B to the terminal A by way of rectifying thyristor $RT_3$, reactor 2A, terminal 3A, GTO bridge-connected inverter 3, motor 4, GTO bridge-connected inverter 3, terminal 3B, reactor 2B and the rectifying thyristor $RT_2$; when the rectifying thyristors $RT_5$ and $RT_4$ are turned on, a third phase current T is supplied from the terminal C to the terminal B by way of the rectifying thyristor $RT_5$, reactor 2A, terminal 3A, GTO bridge-connected inverter 3, motor 4, GTO bridge-connected inverter 3, terminal 3B, reactor 2B, and rectifying thyristor $RT_4$. The rectified full-wave direct current is further smoothed through the DC cumulative reactor having two inductances 2A and 2B magnetically connected each other. Therefore, the smoothed direct current Id is further converted into an alternate current of an appropriate frequency through the GTO inverter 3 to drive the induction motor 4 at any desired speed.

The GTO inverter 3 includes six bridge-connected GTOs $G_1$ to $G_6$. When the GTOs are turned on in the order of $G_1$ and $G_6$ and then $G_3$ with $G_6$ on in sequence for each 60 degrees, an alternate square-wave U-phase current $i_u$ and a V-phase current $i_v$ with each pulse width of 60 degrees is first obtained by the GTO inverter. When the GTOs are turned on in the order of $G_3$ and $G_6$ and then $G_2$ with $G_3$ on in sequence for each 60 degrees, an alternate square-wave V-phase current $i_v$ with each pulse width of 120 degrees is obtained by the GTO inverter. When the GTOs are turned on in the order of $G_3$ and $G_2$ and then $G_5$ with $G_2$ on in sequence for each 60 degrees, an alternate square-wave V-phase current $i_v$ and a W-phase current $i_w$ with each pulse width of 60 degrees is obtained by the GTO inverter.

In other words, when GTOs $G_1$ and $G_6$ are turned on, the rectified direct current Id flows as the U-phase current (the latter half of 120 degrees) $i_u$ through the first U-phase winding having reactance $X_u$ and the third W-phase winding having reactance $X_w$ of the motor. When GTO $G_1$ is turned off and GTO $G_3$ is turned on with GTO $G_6$ kept turned on, the current Id flows as the V-phase current (the first half of 120 degrees) $i_v$ through the second V-phase winding having reactance $X_v$ and the third W-phase winding having reactance $X_w$.

Similarly, when $G_6$ is turned off and $G_2$ is turned on with $G_3$ kept turned on, the current Id flows as the V-phase current (the latter half of 120 degrees) $i_v$ through $X_v$ and $X_u$. When $G_3$ is turned off and $G_5$ is turned on with $G_2$ kept turned on, the current Id flows as the W-phase current (the first half of 120 degrees) $i_w$ through $X_w$ and $X_u$.

In summary, GTOs are turned on or off in the order of $G_1$, $G_6$, $G_3$, $G_2$, $G_5$ and $G_4$ for each 60 degrees. The current passed through these three-phase windings having motor reactances $X_u$, $X_v$, and $X_w$ generates a rotational magnetic flux.

Whenever each of these three-phase windings is switched off, commutation surge voltages are inevitably generated by the magnetic energy stored in the respective windings. In order to absorb these commutation surge voltages, there is additionally provided a surge voltage clamping circuit including a diode bridge-connected commutation surge voltage rectifying section 5 made up of fix diodes $D_1$ to $D_6$ and a surge voltage clamping section 6 made up of an electrolytic capacitor $C_1$, two capacitors $C_2$ and $C_3$, two ordinary thyristors $T_1$ and $T_2$, four diodes $D_8$ to $D_{11}$, two turning-off inductors $L_1$ and $L_2$, and a reactor having two reactances $Lr_1$ and $Lr_2$, as shown in FIG. 1. In the above reactor, the positive side of the first reactance $Lr_1$ is connected to the positive terminal of the DC rectifier 1 through the diode $D_{10}$; the negative side of the second reactance $Lr_2$ is connected to the negative terminal of the DC rectifier through the diode $D_{11}$, respectively.

The operation of the prior-art surge voltage clamping circuit will be described hereinbelow with reference to FIGS. 1 and 2.

Figure 2:
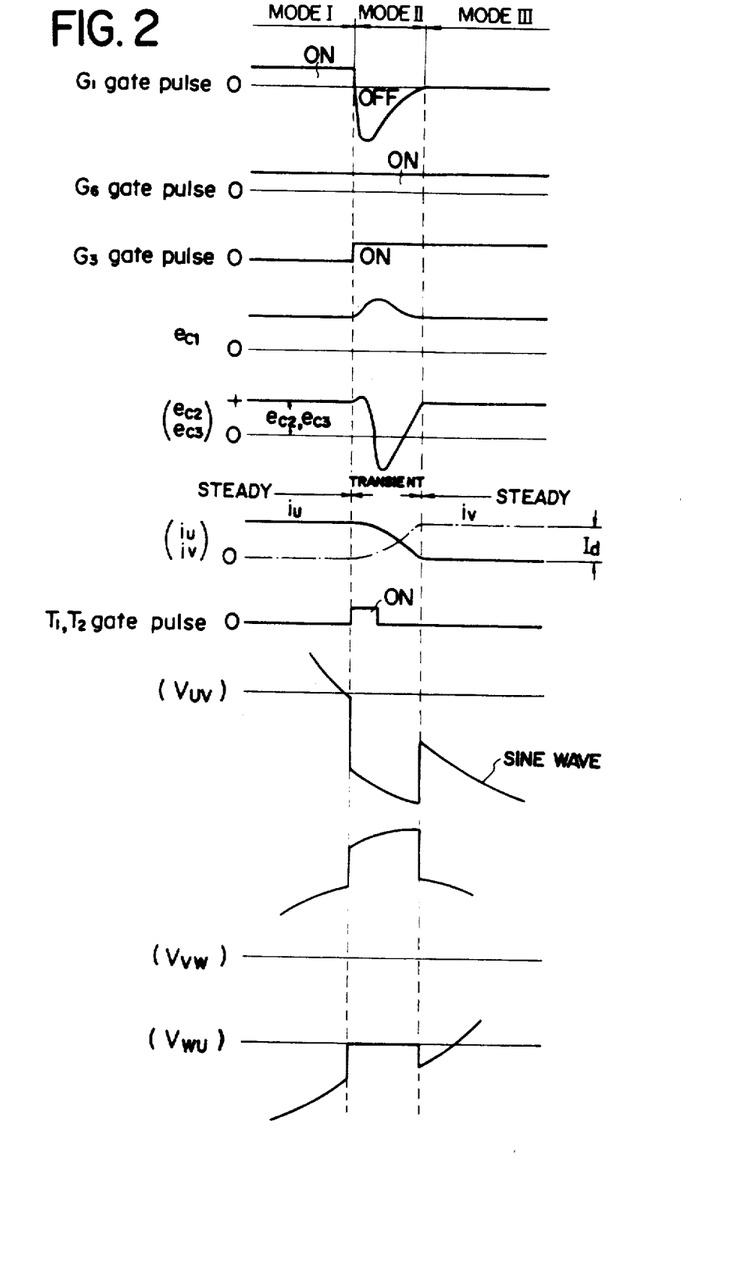
FIG. 2 is a timing chart of the prior-art surge voltage clamping circuit for the current-type GTO inverter shown in FIG. 1, for assistance in explaining the operation thereof.

When mode I ($G_1$ and $G_6$ are on) is switched to mode II ($G_1$ is off, $G_6$ is on, $G_3$ is on), for instance, as depicted in FIG. 2, the current $i_u$ flowing through windings $X_u$ and $X_w$ is commutated to the current $i_v$ flowing through windings $X_v$ and $X_w$. In this transient state, the current $i_u$ does not immediately fall to zero level but decreases gradually and the current $i_v$ does not immediately rise to the current Id but increases gradually as depicted in FIG. 2. This is because there exists each inductance in each winding and thereby an induced surge voltage is inevitably generated across each winding. It is very important to suppress or eliminate these induced surge voltages for protection of GTO thyristors.

An induced surge voltage $V_{vw}$ developed across the windings $X_v$ and $X_w$ in this transient state can be charged in the capacitor $C_1$ as follows: When the surge voltage $V_{vw}$ exceeds the voltage across the capacitor $C_1$, since the diodes $D_3$ and $D_6$ are both forward biased (the anode of $D_3$ is high in voltage level; the cathode of $D_6$ is low in voltage level), the major part of the current to be passed through the winding $X_v$ flows by way of GTO $G_3$, diode $D_3$, capacitor $C_1$, diode $D_6$ and GTO $G_6$. In this transient state, the surge voltage $V_{vw}$ is suppressed by the capacitor $C_1$ if the voltage $e_{c1}$ across the capacitor $C_1$ is sufficiently low.

Simultaneously, when an induced surge voltage $V_{uv}$ developed across the windings $X_u$ and $X_v$ in this transient state falls to the voltage $e_{c1}$ of the capacitor $C_1$, since the diode $D_3$ and $D_2$ are both forward biased (the cathode of $D_2$ is low in voltage level and anode of $D_3$ is high in voltage level), the commutation energy generated across the windings $X_u$ and $X_v$ is charged into the capacitor $C_1$ by way of GTO $G_3$, diode $D_3$, capacitor $C_1$, diode $D_2$, winding $X_u$, winding $X_w$ and GTO $G_6$. In this transient state, the surge voltage $V_{uv}$ is suppressed by the capacitor $C_1$. As a result, the induced surge voltage $V_{wu}$ developed across the windings $X_w$ and $X_u$ becomes zero as shown in FIG. 2. The current $i_v$ increases gradually up to the direct current Id in accordance with a time constant determined by the circuit constant of the motor load. When the current $i_u$ reaches zero, the diode $D_2$ is cut off. Simultaneously, no induced surge voltage is generated in the winding $X_u$. When the induced surge voltage $V_{vw}$ falls below the capacitor voltage $e_{c1}$, the diodes $D_3$ and $D_6$ are both cut off, so that the capacitor $C_1$ is electrically disconnected from the inverter 3 and thus the commutation from GTO $G_1$ to GTO $G_3$ is completed.

The above-mentioned mode II corresponds to the overlapped (transient) period in a series-connected diode type current inverter. However, there still exists a difference between the GTO inverter shown in FIG. 1 and the series-connected diode type current inverter in that two transient currents flow through the each-phase winding in the directions opposite to each other being superimposed upon each other.

When the charged-up voltage $e_{c1}$ in the capacitor $C_1$ increases sufficiently, the two reverse blocking ordinary thyristors $T_1$ and $T_2$ are turned on in response to a pulse applied to each gate terminal. Therefore, the surge voltage energy stored in the capacitor $C_1$ is discharged to the DC source terminals 3A and 3B of the GTO inverter 3 by way of inductor $L_1$, thyristor $T_1$, reactor $Lr_1$, diode $D_{10}$, reactor 2A, GTO inverter 3, motor 4, GTO inverter 3, reactor 2B, diode $D_{11}$, reactor $Lr_2$, thyristor $T_2$, and inductor $L_2$. The above-mentioned discharge is called commutation surge voltage energy restoration or energy rebound. In this initial state of discharge, the capacitors $C_2$ and $C_3$ are also charged up with the polarity as shown in FIG. 1. These two capacitors $C_2$ and $C_3$ form two vibration circuits independently. The first vibration circuit is made up of the capacitor $C_2$ and the inductor $L_1$; the second vibration circuit is made up of the capacitor $C_3$ and the inductor $L_2$, each having a relatively high frequency or a relatively small time constant. An example of the voltage wave form $e_{c2}$ or $e_{c3}$ across the capacitor $C_2$ or $C_3$ is also shown in FIG. 2. When the polarity of the capacitor $C_2$ or $C_3$ of the vibration circuit is reversed, the thyristor $T_1$ or $T_2$ is automatically turned off, because a positive potential is applied to the cathode of the thyristor $T_1$ to $T_2$. In this state, it should be noted that the polarity of the charged-up voltages of the three capacitors $C_1$, $C_2$, $C_3$ are the same, that is, three charged-up voltages are added to each other. Therefore, when the addition of these three charged-up voltages exceeds the DC source voltage across the thyristor bridge rectifier 1, the energy stored in these three capacitors $C_1$, $C_2$ and $C_3$ are returned to the DC source terminals 3A and 3B by way of the reactor $L_{r1}$, diode 10, reactor 2A, GTO inverter 3, motor 4, GTO inverter 3, reactor 2B, diode $D_{11}$ and the reactor $L_{r2}$. In this energy restoration operation, since the inductance $L_{r1}$ or $L_{r2}$ of the reactor is so determined as to be sufficiently greater than that of the turning-off (vibration) inductor $L_1$ or $L_2$, the two vibration circuits $L_1 \cdot C_2$ and $L_2 \cdot C_3$ can stably vibrate and provide an sufficient turn-off time for the thyristor $T_1$ or $T_2$. In other words, the reactor $L_{r1}$ or $L_{r2}$ functions as a smoothing element. After the surge voltage energy has been discharged, the capacitors $C_2$ and $C_3$ are charged again in the direction as shown in FIG. 1, to the voltage level roughly the same as the voltage $e_{c1}$ across the capacitor $C_1$, because three capacitors $C_1$, $C_2$, and $C_3$ are connected in series.

In this state, since the capacitance of capacitor $C_1$ is determined to be sufficiently great as compared with that of the capacitors $C_2$ or $C_3$, after the capacitors $C_2$ and $C_3$ have been charged up, the magnetic energy stored in the reactor $L_{r1}$ or $L_{r2}$ is recharged into the capacitor $C_1$ by way of diode $D_{11}$, reactor $L_{r2}$, diode $D_8$, capacitor $C_1$, diode $D_9$, reactor $L_{r1}$ and diode $D_{10}$. This energy is unavailable reactive power by nature. After the reactor energy has been recharged into the capacitor $C_1$, the two diodes $D_{10}$ and $D_{11}$ are both returned to its off state, respectively, that is, to the initial conditions. Therefore, the electric discharge of the capacitor $C_2$ or $C_3$ is prevented for being ready for the succeeding commutation of the GTO bridge-connected inverter 3. After the GTO $G_1$ has been turned off and the GTO $G_3$ has been turned on, that is, the commutation has been completed from $G_1$ to $G_3$, the operation mode shifts to the mode III in which the driving current is supplied from GTO $G_3$, through windings $X_v$ and $X_w$, to GTO $G_6$.

In the prior-art surge voltage clamping circuit for the current-type GTO inverter described above, however, there exist some disadvantages as follows.

(1) The turning-off inductors $L_1$ and $L_2$ and the turning-off capacitors $C_1$ and $C_2$ are required for forming two vibration circuits in order to turn off the ordinary thyristors $T_1$ and $T_2$ after the surge voltage energy stored in the capacitor $C_1$ has been restored to the DC source terminals of the GTO inverter 3. Additionally, the commutation energy is restored to the GTO inverter 3 mainly through the capacitors $C_2$ and $C_3$. Therefore, in order to sufficiently restore the stored surge voltage energy even under a heavy load, the capacitance of $C_2$ or $C_3$ should be relatively large. When capacitors having a large capacitance are used, the vibration frequency becomes low, thus resulting in turn-off failure of the ordinary thyristors $T_1$ and $T_2$. In other words, it is impossible to stably operate the surge voltage clamping circuit at a high frequency range when a heavy load is applied to the induction motor.

(2) Since the added charged-up voltage of the series-connected capacitors $C_1$, $C_2$, and $C_3$ is restored to the GTO inverter 3 through the cumulative reactor having reactances $L_{r1}$ and $L_{r2}$, a large inductance is required for this reactor. Otherwise, current overshoot may be generated. In other words, the cost of the reactor $L_{r1}$ and $L_{r2}$ is relatively high.

Figure 3A:
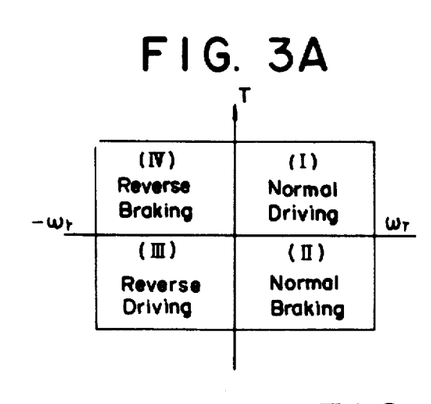
FIG. 3A is a coordinate with rotor angular frequency as abscissa and with rotor torque as ordinate, for assistance in explaining four quadrant operation of one feature of the present invention.

By the way, in order to drive an induction motor in the same manner as in a DC motor, four-quadrant operation is indispensable. This four-quadrant operation will be described below. As depicted in FIG. 3A, when the rotor angular frequency $\omega_r$ is taken as abscissa and the motor torque T is taken as ordinate, the first quadrant indicates that a motor is driven in the normal rotational direction; the second quadrant indicates that the motor is braked while rotating in the normal direction; the third quadrant indicates that the motor is driven in the reverse rotational direction; the fourth quadrant indicates that the motor is braked while rotating in the reverse direction.

Figure 3B:
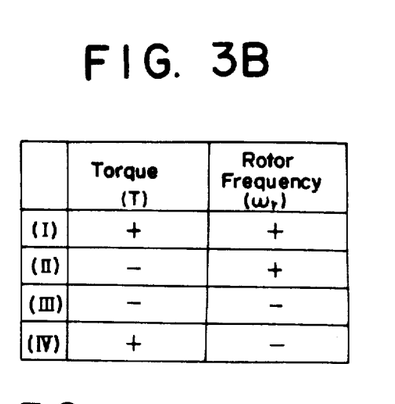
FIG. 3B is a table showing signs of the rotor torque and the rotor angular frequency being classified into four quadrants.

In other words, in the first quadrant, the motor torque T is positive and the rotor angular frequency $\omega_r$ also is positive; in the second quadrant, T is negative but $\omega_r$ is positive; in the third quadrant, T is negative and $\omega_r$ is also negative; in the fourth quadrant, T is positive but $\omega_r$ is negative, as depicted in FIG. 3B.

Figure 3C:
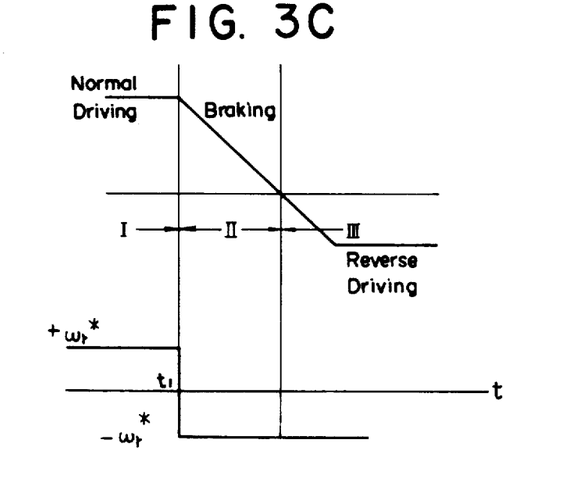
FIG. 3C is a graphical representation showing an example of the four-quadrant operation, in which motor driving mode is shifted from the first quadrant operation, through the second quadrant operation, to the third quadrant operation when the reference rotor angular frequency is switched from the normal direction to the reverse direction.

FIG. 3C shows an example in which a motor rotating in the normal direction is switched to the reverse direction at time $t_1$. In more detail, when a motor is rotating in the 1st quadrant operation (T>0, $\omega_r$>0), if the reference frequency (speed) $+w^*_r$ is switched to $-w^*_r$, the motor rotates in the 2nd quadrant operation (T<0, $\omega_r$>0) (the motor is braked or the motor torque is adsorbed). The instant the rotor frequency reaches zero, the motor begins to rotate in the 3rd quadrant operation (T<0, $\omega_r$<0) (the motor is driven in the reverse direction).

Further, in the above description, it should be noted that while the induction motor is being braked for stopping the motor or for reversing the rotational direction of the motor, the induction motor operates as a generator which can return the motor rotational kinetic energy to the AC source side.

Therefore, the prior-art surge voltage clamping circuit shown in FIG. 1 has the following third disadvantages:

(3) Since the charging and discharging circuits for the capacitor is provided only for motor-driving operation, it is impossible to discharge or regenerate the motor kinetic energy stored in the capacitor in motor-braking operation (motor operates as a generator in brake) to the AC source side or to charge the magnetic energy stored in the reactor in motor-braking operation in the capacitor.

Figure 4:
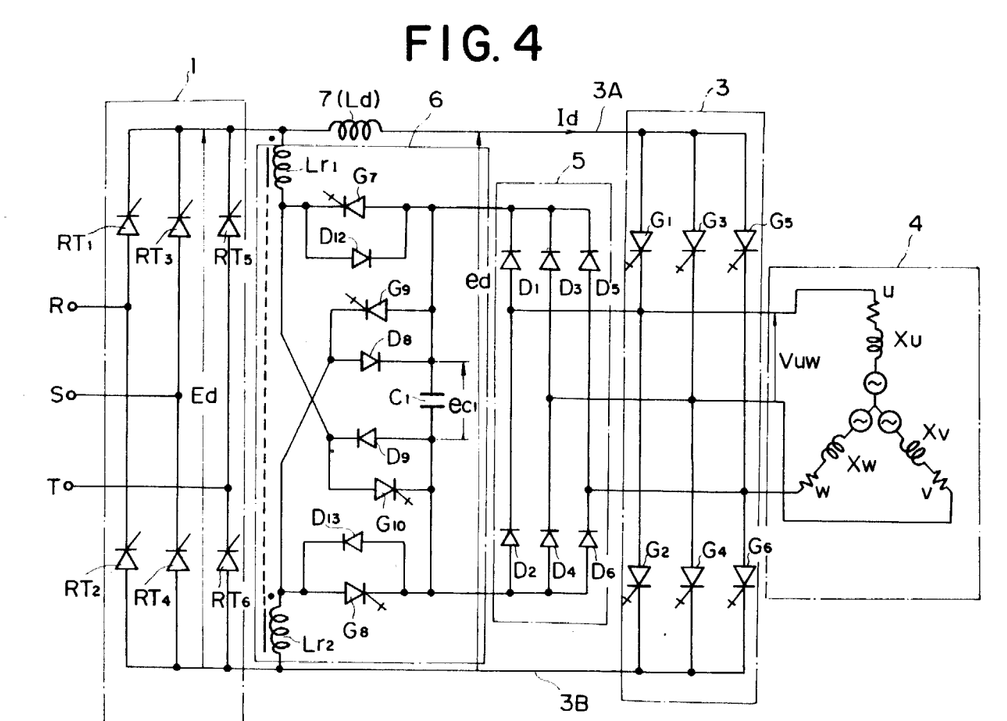
FIG. 4 is a circuit diagram of the surge voltage clamping circuit for a current-type GTO inverter according to the present invention.

In view of the above description, reference is now made to an embodiment of a surge voltage clamping circuit for a current-type GTO inverter according to the present invention with reference to FIG. 4. In this embodiment, GTOs are incorporated in the surge voltage clamping circuit, without providing turning-off (vibration) circuits, in order to operate the circuit stably at a high speed.

In FIG. 4, the points different from the prior-art surge voltage clamping circuit shown in FIG. 1 are that (1) a single direct-current reactor 7 is incorporated in place of the cumulative direct-current reactors 2A and 2B and (2) four gate turn-off thyristors (GTOs) $G_7$, $G_8$, $G_9$ and $G_{10}$ and four diodes $D_8$, $D_9$, $D_{12}$ and $D_{13}$ are incorporated without providing the vibration circuits including two inductors $L_1$ and $L_2$ and capacitors $C_2$ and $C_3$.

A surge voltage clamping circuit 6 or a surge energy restoring circuit according to the present invention comprises an electrolytic capacitor $C_1$ for absorbing the commutation surge voltage energy, four GTOs $G_7$, $G_8$, $G_9$ and $G_{10}$ for restoring the surge voltage energy stored in the capacitor $C_1$ to the GTO inverter 3, a cumulative reactor having two inductive reactances $Lr_1$ and $Lr_2$ magnetically connected to each other for smoothing the current restored from the capacitor $C_1$ to the GTO inverter 3, and four diodes $D_8$, $D_9$, $D_{12}$, and $D_{13}$ for transferring the magnetic energy stored in the reactor $Lr_1$, $Lr_2$ to the capacitor $C_1$ after the surge voltage energy stored in the capacitor $C_1$ has been restored.

The first pair of GTOs $G_7$ and $G_8$ serve to discharge or restore the surge voltage energy generated in motor-driving operation to the DC source terminals of the GTO inverter 3; the second pair of GTOs $G_9$ and $G_{10}$ serve to discharge or regenerate the motor kinetic energy generated in motor braking operation to the AC source side of the GTO inverter 3.

The electrolytic capacitor $C_1$ is connected in parallel with the diode bridge-connected commutation surge voltage rectifier 4. The first two GTOs $G_7$ and $G_8$ are connected between the reactor $Lr_1$ and $Lr_2$ and the capacitor $C_1$ as follows: the positive side of the first winding $Lr_1$ is connected to the positive terminal of the DC source; the negative side of the first winding $Lr_1$ is connected to the cathode of the first GTO $G_7$; the anode of the first GTO $G_7$ is connected to the positive side of the capacitor $C_1$; the negative side of the second winding $Lr_2$ is connected to the negative terminal of the DC source; the positive side of the second winding $Lr_2$ is connected to the anode of the second GTO $G_8$, and the cathode of the second GTO $G_8$ is connected to the negative side of the capacitor $C_1$, respectively, respectively.

Further, the two diodes $D_8$ and $D_9$ are connected between the reactor $Lr_1$ and $Lr_2$ and the capacitor $C_1$ as follows: the cathode of the first diode $D_8$ is connected to the positive side of the capacitor $C_1$; the anode of the first diode $D_8$ is connected to the positive side of the second winding $Lr_2$; the cathode of the second diode $D_9$ is connected to the negative side of the first winding $Lr_1$ and the anode of the second diode $D_9$ is connected to the negative side of the capacitor $C_1$.

The additional second two GTOs $G_9$ and $G_{10}$ for regenerating the motor rotational energy produced in motor braking operation to the AC source side are connected between the reactor $Lr_1$ and $Lr_2$ and the capacitor $C_1$ as follows: the anode of the third GTO $G_9$ is connected to the positive side of the capacitor $C_1$; the cathode of the third GTO $G_9$ is connected to the positive side of the second winding $Lr_2$, the anode of the fourth GTO $G_{10}$ is connected to the negative side of the first winding $Lr_1$; and the cathode of the fourth GTO $G_{10}$ is connected to the negative side of the capacitor $C_1$.

Further, additional two diodes $D_{12}$ and $D_{13}$ are connected between the reactor $Lr_1$ and $Lr_2$ and the capacitor $C_1$ as follows: the anode of the third diode $D_{12}$ is connected to the negative side of the first winding $Lr_1$; the cathode of the third diode $D_{12}$ is connected to the positive side of the capacitor $C_1$; the anode of the fourth diode $D_{13}$ is connected to the negative side of the capacitor $C_1$; and the cathode of the fourth diode $D_{13}$ is connected to the positive side of the second winding $Lr_2$.

In order to distinguish between the four GTOs and four diodes, the GTOs $G_7$ and $G_8$ are referred to as in-drive energy restoring GTOs; the GTOs $G_9$ and $G_{10}$ are referred to as in-brake energy regenerating GTOs; the diodes $D_8$ and $D_9$ are referred to as in-drive energy restoring diodes; the diodes $D_{12}$ and $D_{13}$ are referred to as in-brake energy regenerating diodes, hereinafter.

As already described with reference to FIG. 2, when the GTO $G_1$ is turned off and the GTO $G_3$ is turned on with the GTO $G_6$ kept turned on, the current $i_v$ cannot rise immediately and the current $i_u$ cannot fall to zero immediately because a commutation surge voltage is developed. The time interval within which two currents $i_u$ and $i_v$ overlap each other corresponds to a transient state. The time interval within which a single current $i_u$ or $i_v$ exists corresponds to a steady state.

The above-mentioned energy restoring GTOs $G_7$ and $G_8$ are turned on only in the driving state and GTOs $G_9$ and $G_{10}$ are turned on only in the braking state but turned off in the transient state, in response to each gate signal generated by each gate circuit (not shown), in order to realize the energy restoration or regeneration function.

The operation of the embodiment of the surge voltage clamping circuit for a current-type GTO inverter according to the present invention will be described hereinbelow with reference to FIGS. 5(A), 5(B), 6, 7(A) to 7(D). Further, the operation is described only during a one-sixth period (60 degrees) of the inverter and during the commutation from GTO $G_1$ (U phase) to GTO $G_3$ (V phase).

Figure 5A:
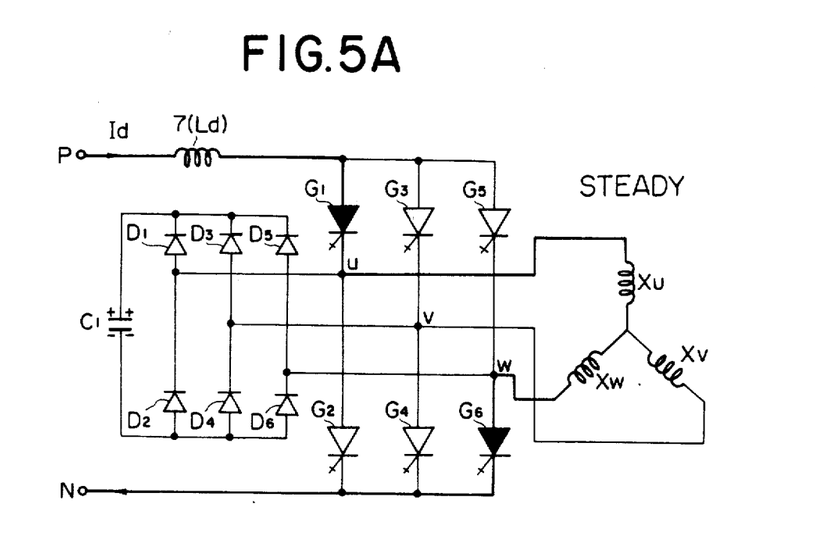
FIG. 5(A) is a partial circuit diagram of the surge voltage clamping circuit for the current-type GTO inverter according to the present invention, in which a steady-state current path obtained when GTO $G_1$ and GTO $G_6$ are both turned on is depicted by thicker lines.

FIG. 5(A) shows a steady state (single current period) where GTOs $G_1$ and $G_6$ are both turned on, so that a load current Id flows from the positive terminal P to the negative terminal N by way of DC reactor 7, GTO $G_1$, reactance $X_u$, reactance $X_w$ and GTO $G_6$ as a U-phase constant load current $i_u$ as depicted in FIG. 2.

Figure 5B:
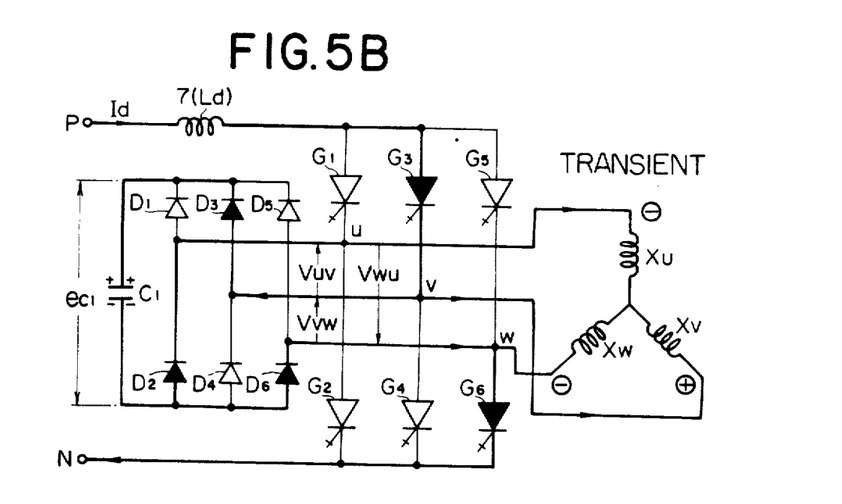
FIG. 5(B) is the same partial circuit diagram as in FIG. 5(A), in which transient-state current paths obtained immediately after GTO $G_1$ has been turned off and GTO $G_3$ has been turned on with GTO $G_6$ kept on are depicted by thicker lines.

In general, since no time delay exists due to inductive elements in the gate circuit of GTOs, it is possible to instantaneously turn off GTO $G_1$ and to instantaneously turn on GTO $G_3$ in response to gate signals. However, the instant GTO $G_1$ is turned off and GTO $G_3$ is turned on with GTO $G_6$ kept on, a transient state occurs in the inverter circuit 3 as shown in FIG. 2 and FIG. 5(B), in which both the U-phase current $i_u$ and the V-phase current $i_v$ flow (overlap current period). In more detail, upon turning-on of GTO $G_3$, the V-phase current $i_v$ to be passed through the reactances $X_v$ and $X_w$ cannot rise immediately due to the presence of the inductance, as depicted in FIG. 2. When this transient induced surge voltage $V_{vw}$ developed across the induction motor reactances $X_v$ and $X_w$ (positive at $X_v$ and negative at $X_w$) is applied to the capacitor voltage $e_{c1}$, since the diodes $D_3$ and $D_6$ are both forward-biased, the major part of current to be passed through the reactance $X_v$ is bypassed by way of GTO $G_3$, diode $D_3$, capacitor $C_1$, diode $D_6$ and GTO $G_6$. However, this transient induced surge voltage $V_{vw}$ is charged into the capacitor $C_1$ when the voltage across the capacitor $C_1$ is sufficiently low.

Simultaneously, another transient induced surge voltage $V_{uv}$ is developed across the induction motor reactances $X_u$ and $X_v$ (positive at $X_v$ and negative at $X_u$). While this surge voltage $V_{uv}$ rises up to the capacitor voltage $e_{c1}$, since the diodes $D_3$ and $D_2$ are both forward-biased, the surge voltage $V_{uv}$ is restored to the capacitor $C_1$ by way of diode $D_3$, capacitor $C_1$, diode $D_2$, reactance $X_u$, reactance $X_w$, and GTO $G_6$. As a result, the surge voltage $V_{wu}$ across the motor reactances $X_w$ and $X_u$ is reduced to zero. The V-phase current $i_v$ gradually increases up to the direct current Id in accordance with a time constant determined by the circuit constants dependent upon the capacitor voltage $e_{c1}$ at that moment. When the U-phase current $i_u$ reaches zero, the diode $D_2$ is off; the induced surge voltage $V_{vw}$ is no longer produced lower than the capacitor voltage $e_{c1}$, so that the diodes $D_3$ and $D_6$ are both off. In this state, the capacitor $C_1$ is isolated perfectly from the GTO bridge-connected inverter 3, thus the commutation from GTOs $G_1$ to $G_3$ being completed with the GTO $G_6$ kept turned on.

Figure 6:
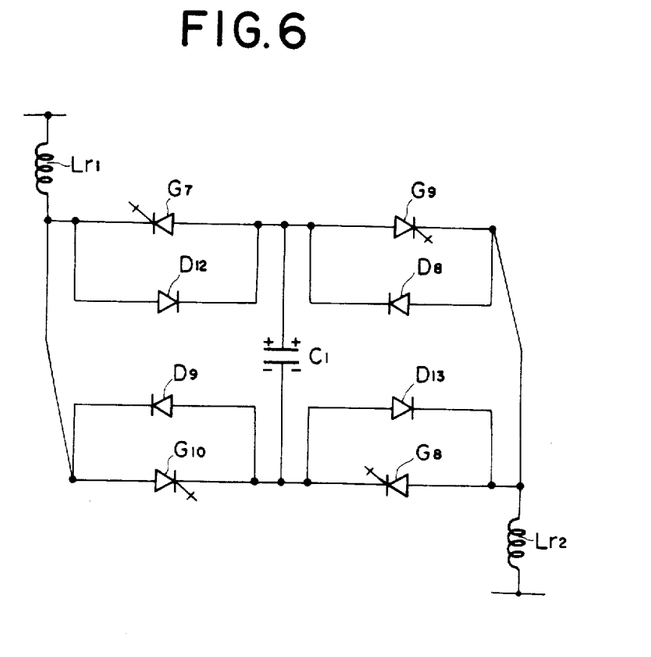
FIG. 6 is a partial circuit diagram of the surge voltage clamping circuit according to the present invention, in which only the charging and discharging paths of the capacitor $C_1$ are shown.

FIG. 6 shows charging and discharging paths of the capacitor $C_1$ in the surge voltage clamping circuit 6 shown in FIG. 4, by which it is possible to better understand the operation to charge energy to the capacitor $C_1$ or the operation to discharge the charged energy to the GTO inverter 3.

Further, these charging and discharging paths shown in FIG. 6 are separately depicted in FIGS. 7(A) to 7(D), being classified into four states.

Figure 7A:
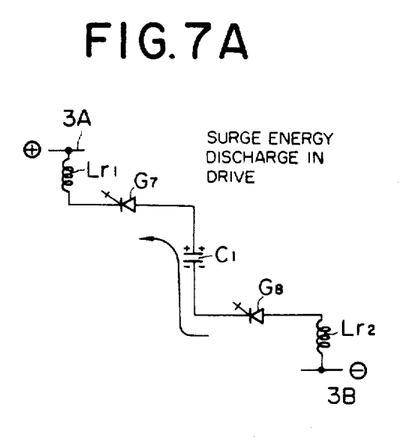
FIG. 7(A) is a partial circuit diagram of the surge voltage clamping circuit according to the present invention, through which surge voltage energy stored in the capacitor is discharged or restored to the inverter in motor-driving operation.

(1) Surge energy restoration in motor-driving operation:

Since the GTOs $G_7$, $G_8$ and $G_9$, $G_{10}$ are all turned off in the transient interval (commutation period or overlap current period), the surge voltage energy is charged as pulsive current $i_{DBR}$ (shown in FIG. 12) from the inverter 3 to the capacitor $C_1$ through the diode bridge-connected rectifier 5 as already described with reference to FIG. 5(B), so that the capacitor voltage $e_{c1}$ increases gradually. When the energy restoring GTOs $G_7$ and $G_8$ are turned on in the steady state interval (single current period), the energy stored in the capacitor $C_1$ is discharged (restored) to the DC source terminals 3A and 3B of the GTO inverter 3 by way of capacitor $C_1$, GTO $G_7$, reactor $Lr_1$, reactor 7, GTO inverter 3, motor 4, GTO inverter 3, reactor $Lr_2$, GTO $G_8$, and capacitor $C_1$, as depicted in FIG. 7(A).

Figure 7B:
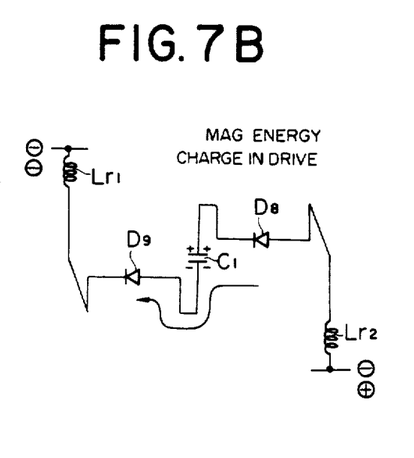
FIG. 7(B) is a similar partial circuit diagram, through which magnetic energy stored in the reactor is charged into the capacitor in motor-driving operation.

Further, since the two GTOs $G_7$ and $G_8$ are kept turned off in the transient state interval, the magnetic energy stored in the reactor $Lr_1$, $Lr_2$ is charged into the capacitor $C_1$ by way of reactor $Lr_2$, diode $D_8$, capacitor $C_1$, diode $D_9$, reactor $Lr_1$, as depicted in FIG. 7(B). Therefore, the capacitor $C_1$ is charged up in the same porality as in the surge voltage.

(2) Motor kinetic energy regeneration in motor-braking operation:

When the induction motor is braked, the frequency of the inverter current is lowered; that is, each phase of gate signals applied to the gate terminals of the GTO inverter 3 is delayed from the motor speed. As a result, the polarity of the voltage generated from the inverter 3 is reversed because the motor operates as a generator. In other words, the direction of the current flowing through the reactor Lr is reversed. However, the polarity of the capacity $C_1$ should be kept in a predetermined direction.

Figure 7C:
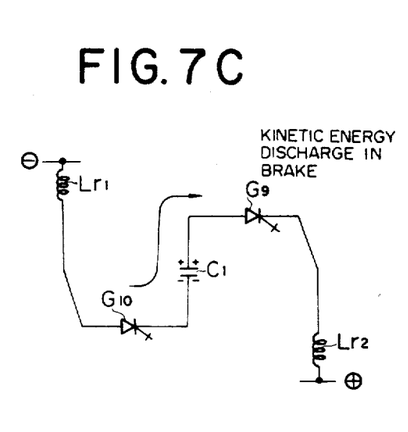
FIG. 7(C) is a similar partial circuit diagram, through which motor kinetic energy stored in the capacitor is discharged or regenerated to the AC source side in motor-braking operation.

The voltage generated by the motor kinetic energy is charged into the capacitor $C_1$ by way of reactor $Lr_2$, diode $D_8$, capacitor $C_1$, diode $D_9$ and reactor $Lr_1$ as depicted in FIG. 7(B). In this state, it should be noted that regenerating GTOs $G_9$, $G_{10}$ are both reverse biased by the diodes $D_8$ and $D_9$. Under these conditions, these GTOs will not be turned on even if a gate signal is applied to each of the gate terminals. However, after the current supplied from the reactor $Lr_1$ and $Lr_2$ to the capacitor $C_1$ has decreased to near zero, the energy regenerating GTOs $G_9$, $G_{10}$ can be turned on, so that the energy charged in the capacitor $C_1$ is discharged or regenerated to the AC source side by way of capacitor $C_1$, GTO $G_9$, reactor $Lr_2$, the thyristor bridge-connected current rectifier 1, reactor $LR_1$, GTO $G_{10}$ and capacitor $C_1$ as depicted in FIG. 7(C). In this state, since the voltage $e_{c1}$ is high, the diodes $D_{12}$ and $D_{13}$ are reverse biased. However, since the regeneration energy in motor braking operation becomes great in a moment and therefore the capacitor $C_1$ is immediately charged up. It is preferable to turn on the GTO $G_9$ and $G_{10}$ whenever the voltage $e_{c1}$ across the capacitor $C_1$ exceeds a predetermined reference value.

Figure 7D:
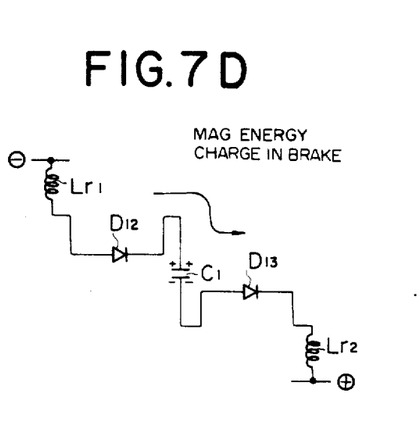
FIG. 7(D) is a similar partial circuit diagram, through which magnetic enegy stored in the reactor is charged into the capacitor in motor-braking operation.

Further, when the voltage $e_{c1}$ drops below a predetermined value and therefore the GTOs $G_9$, $G_{10}$ are turned off, the magnetic energy stored in the reactor Lr in motor-braking operation is recharged into the capacitor $C_1$ by way of reactor $Lr_1$, diode $D_{12}$, capacitor $C_1$, diode $D_{13}$, and reactor $Lr_2$ as depicted in FIG. 7(D). The above-mentioned regenerative braking operation is completed while the motor is being braked. When the induction motor is switched from braking operation to reverse operation, the phase order of the GTO inverter 3 is reversed, as compared with that when the induction motor is driven in the forward direction. In this case, since only the phase order is reversed, the operation is quite the same as that when the motor is driven in the forward direction as shown in FIGS. 7(A) and 7(B).

As described above, the surge voltage clamping circuit of the present invention provides the first function to absorb or charge the surge voltage energy generated in transient state interval (commutation period) and to restore or discharge the surge voltage energy to the DC source terminal of the GTO inverter in the steady state interval in the motor-driving operation, the second function to absorb or charge the magnetic energy stored in the reactor in the transient state interval and to restore or discharge the magnetic energy to the DC source terminal of the GTO inverter in the steady state in both the motor-driving and -braking operation, and the third function to absorb or charge the motor kinetic energy and to regenerate or discharge the energy to the AC source side in the motor-braking operation.

Hereupon, the above surge voltage absorbing function is greatly dependent upon the voltage $e_{c1}$ developed across the capacitor $C_1$. This voltage $e_{c1}$ can be controlled by adjusting the off-time interval $\tau$ of the GTOs $G_7$ and $G_8$.

Figure 8:
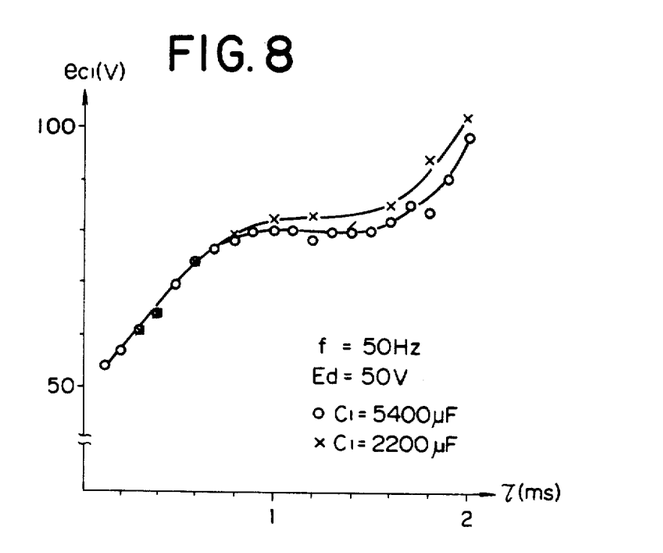
FIG. 8 is a graphical representation showing the relationship between the off-time interval $\tau$ of GTOs $G_7$ and $G_8$ and the capacitor voltage $e_{c1}$ with the capacitor $C_1$ as parameter at a fixed dc source voltage Ed and a fixed inverter frequency f.

FIG. 8 shows the relationship between the off-time interval $\tau$ of the GTOs $G_7$ and $G_8$ and the capacitor voltage $e_{c1}$ with the capacitance $C_1$ as parameter at a fixed dc source voltage Ed and a fixed frequency f of the GTO inverter 3. This graphical representation indicates that the longer the off-time interval $\tau$ of GTOs $G_7$ and $G_8$, the higher the voltage $e_{c1}$, because the discharge time interval of the capacitor $C_1$ decreases. However, there exists little influence of the capacity of the capacitor $C_1$ upon the capacitor voltage $e_{c1}$.

Figure 9:
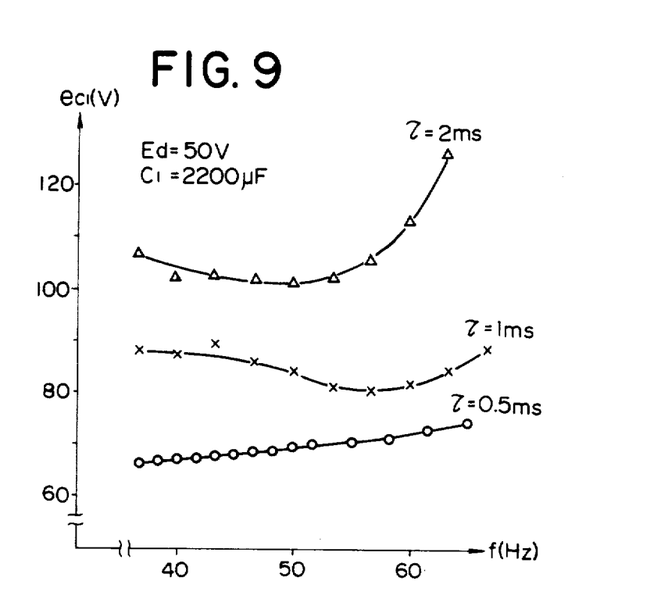
FIG. 9 is a graphical representation showing the relationship between the inverter frequency f and the capacitor voltage $e_{c1}$ with the off-time interval $\tau$ as parameter at a fixed dc source voltage Ed and a fixed capacitor $C_1$.

FIG. 9 shows the relationship between the frequency f of the GTO inverter 3 and the capacitor voltage $e_{c1}$ with the off-time interval $\tau$ as parameter at a fixed dc source voltage Ed and a fixed capacitance $C_1$. This graphical representation indicates that the higher the frequency f, the higher the voltage $e_{c1}$, because the commutation energy per unit time increases. However, the shorter the off-time interval $\tau$, the capacitor voltage $e_{c1}$ undergoes little influence of change in the frequency f.

Figure 10:
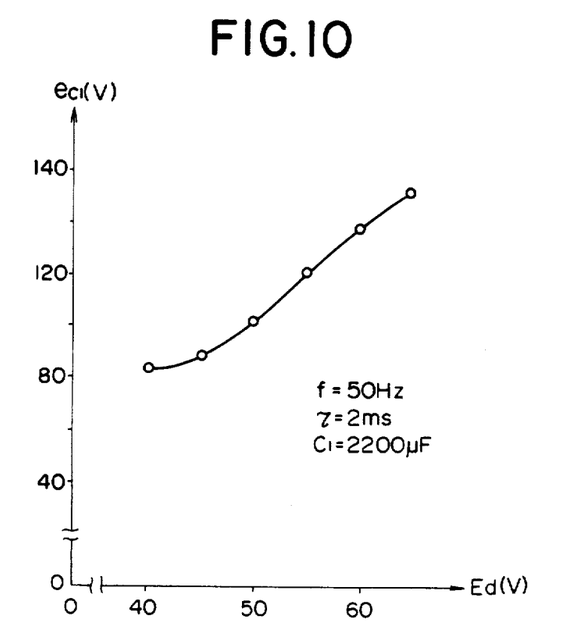
FIG. 10 is a graphical representation showing the relationship between the dc source voltage Ed and the capacitor voltage $e_{c1}$ at a fixed inverter frequency f, a fixed off-time interval $\tau$ and a fixed capacitor $C_1$.

FIG. 10 shows the relationship between the dc source voltage Ed and the capacitor voltage $e_{c1}$ at a fixed frequency f of the inverter 3, a fixed off-time interval $\tau$ of the GTOs $G_7$ and $G_8$ and a fixed capacitance $C_1$. This graphical representation indicates that the capacitor voltage $e_{c1}$ increases with increasing dc source voltage Ed and further $e_{c1}$ always exceeds Ed.

As explained above, the off-time interval $\tau$ of the GTOs $G_7$ and $G_8$ incorporated in the surge voltage clamping circuit 6 according to the present invention exerts a serious influence upon the clamping operation of surge voltage.

Further, in the case where the DC source voltage Ed is low, it should be noted that since the capacitor voltage $e_{c1}$ increases with increasing the off-time interval $\tau$ as depicted in FIG. 8, the clamping operation is deteriorated, thus resulting in sharp waveform change in the motor load current.

Figure 11A:
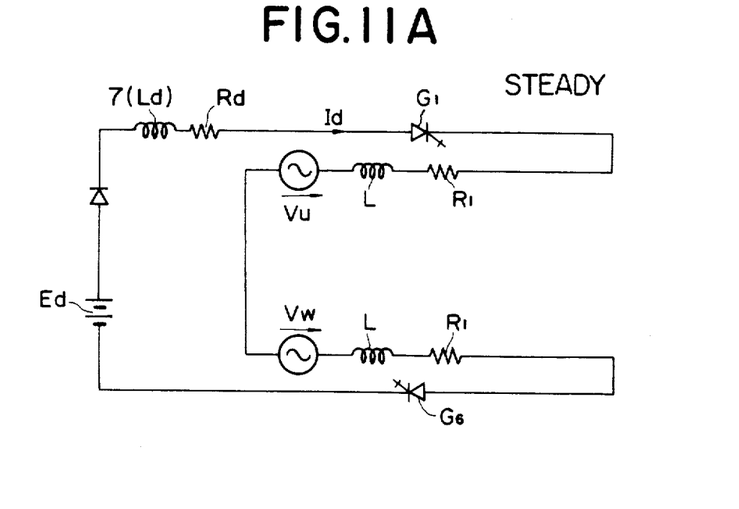
FIG. 11(A) is a equivalent circuit diagram corresponding to the current path shown by thicker lines in FIG. 5(A), in which GTOs $G_1$ and $G_6$ are both on and the circuit is in the steady state.
Figure 11B:
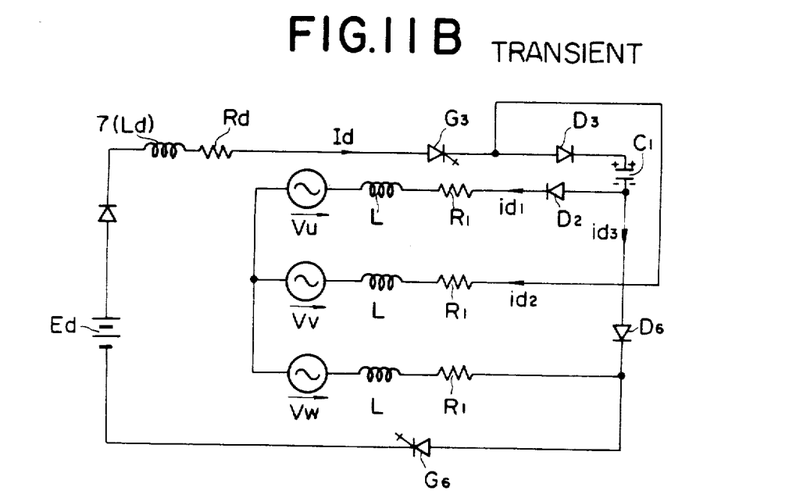
FIG. 11(B) is a equivalent circuit diagram corresponding to the current paths shown by thicker lines in FIG. 5(B), in which GTO $G_1$ has been turned off and GTO $G_3$ has been turned on with GTO $G_6$ kept on and the circuit is in the transient state.

FIG. 11(A) shows an equivalent circuit diagram corresponding to the current path shown by thicker lines in FIG. 5(A). That is, FIG. 11(A) shows the steady state where both GTOs $G_1$ and $G_6$ are turned on. However, a discharging loop of the capacitor $C_1$ is neglected. FIG. 11(B) shows an equivalent circuit diagram coresponding to the current paths shown by thicker lines in FIG. 5(B). That is, FIG. 11(B) shows the transient state GTO $G_1$ has been turned off and GTO $G_3$ has been turned on with GTO $G_6$ kept on.

With reference to FIG. 11(A), it is possible to obtain a steady-state circuit equation as follows:

$$(L_d+2L)dI_d/dt+(R_d+2R_1)i_d+V_u-V_w=E_d$$

$$V_u=E\sin(\omega t+\psi_1 2\pi/3)$$

$$V_w=E\sin(\omega t+\psi_1-2\pi/3)$$

Similarly, with reference to FIG. 11(B), it is possible to obtain transient-state circuit equations as follows:

$$2L\frac{di_{d1}}{dt}+L\frac{di_{d2}}{dt}+2R_1 i_{d1}+R_1 i_{d2}+V_u-V_w=0$$

$$L_d\frac{dI_d}{dt}+Rdi_d+2L\frac{di_{d2}}{dt}+2R_1 i_{d2}+L\frac{di_{d1}}{dt}+$$

$$R_1 i_{d1}+V_u-V_w=E_d$$

$$Ld\frac{dI_d}{dt}+RdI_d+\frac{1}{C_1}\int(i_{d1}+i_{d3})dt+\theta_{c1}=E_d$$

$$V_u=E\sin(\omega t+\psi_2+2\pi/3)$$

$$V_v=E\sin(\omega t+\psi_2)$$

$$V_w=E\sin(\omega t+\psi_2-2\pi/3)$$

$$V_u'=V_u+L\frac{di_{d1}}{dt}+R_1 i_{d1}$$

$$V_v'=V_v+L\frac{di_{d2}}{dt}+R_1 i_{d2}$$

$$V_w'=V_w-L\frac{d(i_{d1}+i_{d2})}{dt}-R_1(i_{d1}+i_{d2})$$

where
$R_1$: induction motor stator resistance
L: sum of stator and rotor leakage inductance
$V_u$, $V_v$, $V_w$: motor's counter electromotive force (CEMF) generated by fundamental component of input current
$e_{c1}$: initial capacitor voltage
E: peak phase voltage of motor CEMF $\psi$: phase angle between fundamental component of input current and fundamental component of CEMF
$V_u'$, $V_v'$, $V_w'$: each phase terminal voltage
$\omega$: inverter angular frequency.
$I_d$: dc current flowing from dc source Ed
$i_{d1}$: current flowing through phase u
$i_{d2}$: current flowing through phase v
$i_{d3}$: current flowing through diode $D_6$
$E_d$: average voltage of dc source Ed
$R_d$: resistance of dc reactor 7
$L_d$: inductance of dc reactor 7

Figure 12:
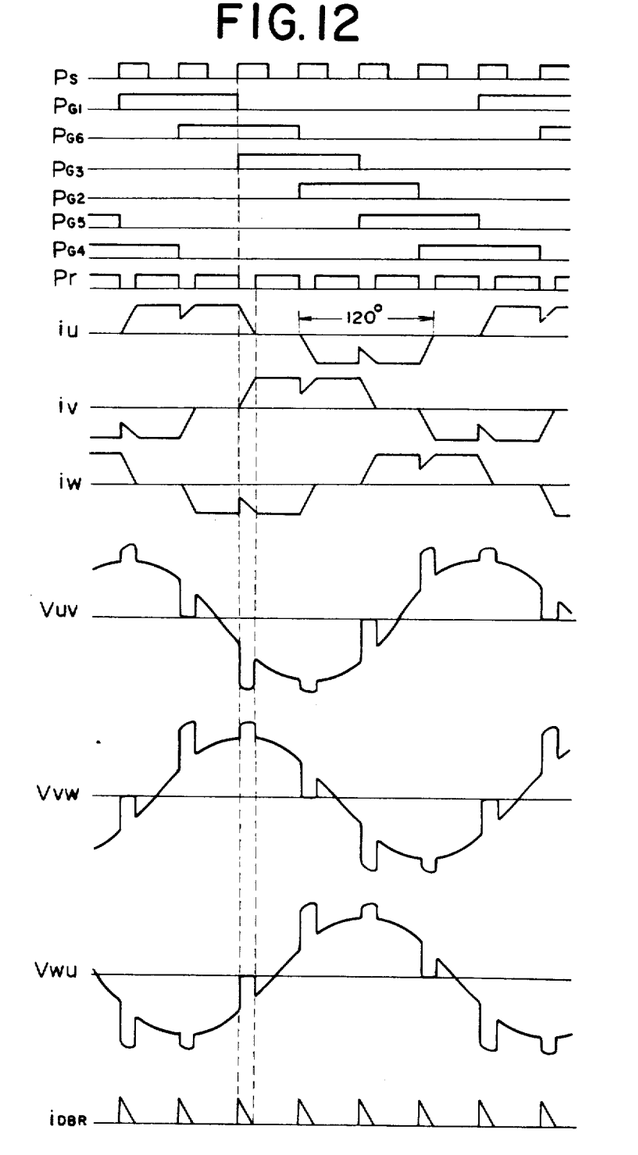
FIG. 12 is a timing chart of the surge voltage clamping circuit for the current-type GTO inverter shown in FIG. 4, in which the time interval between two dashed lines partially corresponds to that shown in FIG. 2.

FIG. 12 shows a timing chart of waveforms of the inverter shown in FIG. 4, in which the time interval enclosed between two dashed lines roughly corresponds to FIG. 2. In FIG. 12, the output current $i_u$ rises and falls relatively gradually and surge voltage are sufficiently clamped or suppressed. Further, the output current $i_{DBR}$ of the diode bridge-connected circuit 5 is generated for each commutation in pulsive waveform state to sequentially charge up the capacitor $C_1$.

The surge voltage clamping circuit according to the present invention has the following various features:

(1) The circuit operates stably when driving an induction motor at a high speed, because there are provided no vibration or commutation circuits to turn off ordinary thyristors.

(2) The circuit is high in energy conversion efficiency, because no commutating capacitors are provided.

(3) The circuit cost is reduced, because an ordinary DC reactor can be used in place of a cumulative DC reactors, because the energy stored in the capacitor $C_1$ is discharged frequently through the GTOs, and no commutating thyristors to generate sharp transient current are incorporated.

(4) The circuit can protect the GTOs ($G_1$ to $G_6$) of the inverter circuit from induced surge voltages in dependence upon relative-small GTOs ($G_7$ to $G_{10}$) of the clamping circuit.

(5) The magnitude of the surged voltage and the time interval of the transient state can be adjusted by adjusting the off-time intervals of the GTOs of the clamping circuit.

(6) The circuit can restore or regenerate surge voltage, magnetic or kinetic energy both in motor-driving operation and motor-braking operation.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. In a current type gate turn-off thyristor inverter having AC source terminals for driving an induction motor, comprising:
 (a) a GTO bridge-connected inverter;
 (b) a thyristor bridge-connected rectifier;
 (c) a diode bridge-connected commutation surge voltage rectifier connected to said GTO bridge-connected inverter;
 (d) a capacitor connected to said diode bridge-connected commutation surge voltage rectifier for storing a commutation surge voltage energy generated when each of the thyristors of said GTO bridge-connected inverter is turned off;

(e) a cumulative reator having a first winding a positive side of which is connected to a positive terminal of said inverter and a second winding a negative side of which is connected to a negative terminal of said inverter;

(f) a DC reactor connected between said rectifier and said inverter;

(g) a first gate turn-off thyristor a cathode of which is connected to a negative side of the first winding of said cumulative reactor and an anode of which is connected to a positive side of said capacitor;

(h) a second gate turn-off thyristor a cathode of which is connected to a negative side of said capacitor and an anode of which is connected to a positive side of the second winding of said cumulative reactor;

(i) a first diode an anode of which is connected to the positive side of the second winding of said cumulative reactor and a cathode of which is connected to the positive side of said capacitor; and (j) a second diode an anode of which is connected to the negative side of said capacitor and a cathode of which is connected to the negative side of the first winding, the improvement wherein said first gate turn-off thyristor is turned on during steady state intervals of inverter commutation and off during transient state intervals of inverter commutation, and said second gate turn-off thyristor is turned on during steady state intervals of inverter commutation and off during transient state intervals of inverter commutation, and wherein said current type gate turn-off thyristor inverter further comprises:

(k) a third gate turn-off thyristor an anode of which is connected to the positive side of said capacitor and a cathode of which is connected to the positive side of said second winding of said reactor, said third gate turn-off thyristor being turned on while the voltage charged in said capacitor exceeds a predetermined value;

(l) a fourth gate turn-off thyristor an anode of which is connected to the negative side of said first winding of said reactor and a cathode of which is connected to the negative side of said capacitor, said fourth gate turn-off thyristor being turned on while the voltage charged in said capacitor exceeds a predetermined value;

(m) a third diode an anode of which is connected to the negative side of said first winding of said reactor and a cathode of which is connected to the positive side of said capacitor; and (n) a fourth diode an anode of which is connected to the negative side of said capacitor and a cathode of which is connected to the positive side of said second winding of said reactor, whereby the commutation surge voltage energy stored in said capacitor during transient state of motor-driving operation is restored to the positive and negative terminals of said inverter through said first and second gate turn-off thyristors during steady state intervals of inverter commutation, magnetic energy stored in said reactor during transient state of motor-driving operation is recharged to said capacitor through said diode bridge-connected commutation surge voltage rectifier after said first and second gate turn-off thyristors have been turned off, the motor kinetic energy generated during motor-braking operation is stored in said capacitor through said first and second diodes and regenerated to the AC source terminal of said inverter through said third and fourth gate turn-off thyristors when the voltage across said capacitor exceeds a predetermined value, and magnetic energy stored in said reactor during motor-braking operation is recharged to said capacitor through said third and fourth diodes after the said third and fourth gate turn-off thyristors have been turned off.

* * * * *